R. L. SLONAKER.
ANTIGLARE ATTACHMENT FOR HEADLIGHTS.
APPLICATION FILED NOV. 2, 1917.
1,270,225.
Patented June 18, 1918.
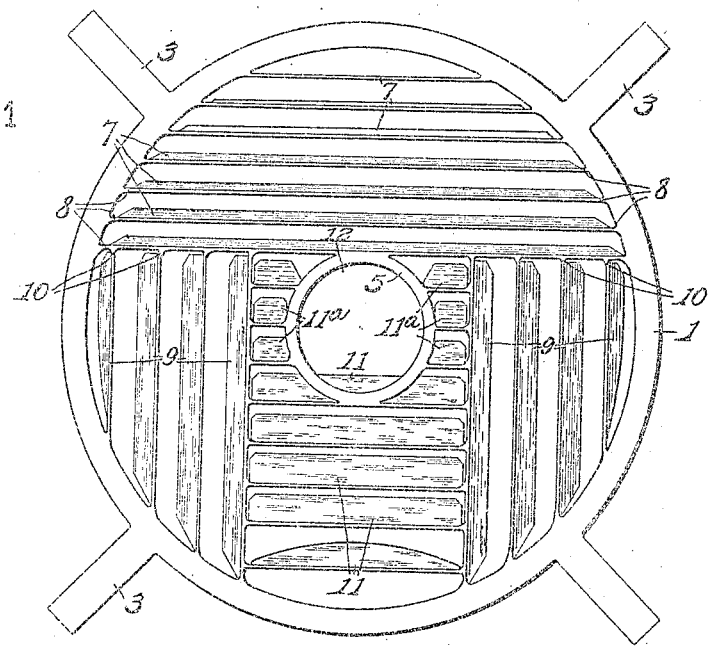
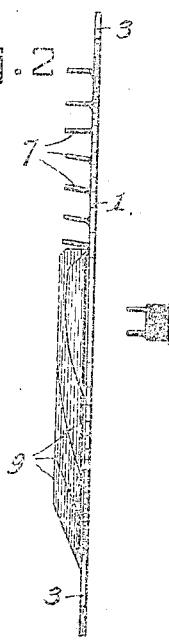
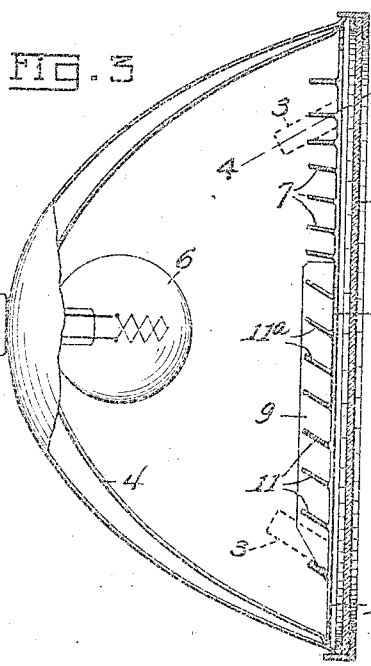
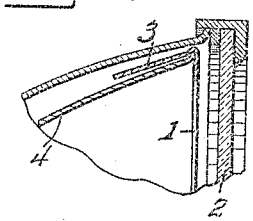
WITNESSES:
INVENTOR:
R. L. Slonaker
BY
ATTORNEY.

UNITED STATES PATENT OFFICE.

ROBERT L. SLONAKER, OF WHEELING, WEST VIRGINIA.

ANTIGLARE ATTACHMENT FOR HEADLIGHTS.

1,270,225.  Specification of Letters Patent.  Patented June 18, 1918.

Application filed November 2, 1917. Serial No. 199,945.

*To all whom it may concern:*

Be it known that I, ROBERT L. SLONAKER, a citizen of the United States of America, and resident of Wheeling, county of Ohio, and State of West Virginia, have invented certain new and useful Improvements in Antiglare Attachments for Headlights, of which the following is a specification.

This invention relates broadly to light-controlling devices, and more particularly to an anti-glare attachment for the headlights of vehicles.

The primary object of the invention is to provide a simple and inexpensive attachment for the headlights of automobiles and other vehicles which, while providing for the projection of light in a forward direction in sufficient volume to afford adequate road illumination to a considerable distance in advance of the car, so breaks up or modifies the direction of reflected rays emanating from the lamp that the latter are rendered unobtrusive to pedestrians and others in the roadway.

A further object is to provide a device of the character mentioned by means of which a large portion of the rays projected forward from the reflector of the headlight are deflected in such manner that they cross in the center line of projection, resulting in deadening or subduing the brilliancy of the direct centrally projected rays to an extent which eliminates the dazzling glare.

With these and other objects in view, the invention resides in the features of construction and arrangement of parts which will hereinafter be fully described, reference being had to the accompanying drawings, in which—

Figure 1 is a front elevation of the invention, detached;

Fig. 2 is an edge view of the same;

Fig. 3 is a vertical section of a headlight with the invention applied thereto; and Fig. 4 is an enlarged detail section taken on the line 4—4, Fig. 3.

The device composing the invention is stamped from a single sheet-metal blank and comprises a circular rim 1 adapted for mounting within a headlight in suitable position, preferably adjacent to the rear face of the headlight glass 2, said rim having a plurality of outwardly directed radial tongues 3 adapted to be bent or turned back into seated clamping relation to the exterior surface of the usual conical reflector 4 employed in headlight structures, as shown in Figs. 3 and 4. A small ring-like member 5 is formed in a concentric position, or in the line of the direct horizontal rays emanating from the lamp 6, said ring defining a central circular opening 12 through which said rays may pass unobstructedly.

Located above said ring-like member 5 and preferably occupying the entire space between said member and the uppermost portion of the rim 1 is a series of parallel horizontally-disposed narrow panels or louvers 7 which are struck up from the metal of the blank and are turned back to form deflectors. Said louvers 7 extend across from side to side of said rim and have their ends connected to the latter by relatively narrow unsevered portions or ties 8 which are twisted more or less in bending said louvers back to their inclined positions. Said louvers may be disposed at a suitable uniform angle to the rim 1, but are preferably arranged at varying inclinations in which the angles successively increase from the lowermost louver to the uppermost louver, which latter may be disposed in a horizontal position as shown in Fig. 1. As is obvious, the arrangement last mentioned provides for the unobstructed passage in a forward direction of the major portion of the rays directed forward from the extreme upper portion of the headlight and serves to deflect in a downward direction a considerable and increasing proportion of the rays as the upper central portion of the headlight is approached by said louvers.

A plurality of relatively short louvers 9 of varying lengths is arranged in two series, one at each of the two opposite sides of the member 5, said louvers being disposed vertically and connected at their upper ends to the lowermost of the louvers 7 by means of uncut portions or ties 10 similar to the ties 8, and having their lower ends connected in like manner to the rim 1. Said louvers are inclined rearward and outward, or in a direction away from the center of the device, to constitute deflectors whereby a large portion of the rays directed forward are deflected in lateral directions crossing an imaginary vertical plane located in a central position in front of the headlight.

Interposed between the lower portion of the central member 5 and the lowermost portion of the rim 1 and extending from the innermost of one series of louvers 9 to the innermost of the other is a series of horizontally disposed louvers 11 which are inclined rearward and upward. Said louvers 11 are designed to permit direct rays from the lamp 6 to pass therebetween to the ground at a short distance in front of the car in a practically unobstructed manner, and also to deflect downward the major portion of those rays from the reflector which would otherwise prove obtrusive to the eyes of approaching persons.

Additionally, such space as is afforded between the member 5 and the adjacent upright louvers 9 may be, and is preferably, filled with short horizontal inclined louvers 11ª, as shown in Fig. 1.

It will be noted that the opening 12 permits of the unobstructed projection of a large volume of direct light from the lamp which serves to illuminate the roadway to a long distance in advance of the car, and also that the various louvers serve to so obstruct and break up the light rays reflected by the reflector which would otherwise meet the eyes of an observer that the objectionable brilliant glare is effectually eliminated. Further, the light rays from the upper and opposite side portions which are deflected by the louvers 7 and 9 are caused to cross the direct or horizontally projected rays to such an extent that the latter are subdued and rendered unobtrusive.

What is claimed is—

1. An anti-glare attachment for headlights, composed of a single sheet-metal blank and comprising two concentric circular rings, the outer of said rings constituting a rim adapted for seating adjacent to the outer edge of the headlight glass, and the inner of said rings defining a central opening in the axial line of the headlight, a plurality of horizontal louvers struck up from said blank and occupying the entire field above the uppermost portion of said inner ring, and a plurality of vertically disposed louvers struck up from said blank and extending from the lowermost of said horizontal louvers to said rim, the louvers at opposite sides of the inner ring being inclined in opposite directions.

2. An anti-glare attachment for headlights composed of a single sheet-metal blank and comprising two concentric circular rings, the outer of said rings constituting a rim adapted for seating adjacent to the outer edge of the headlight glass, and the inner of said rings defining a central opening in the axial line of the headlight, a series of struck-up horizontal louvers extending from side to side of said rim and occupying the field between said inner ring and the topmost portion of said rim, a series of struck-up vertically disposed louvers located at each of the opposite sides of said inner ring and extending from the lowermost of said horizontal louvers to said rim, and a series of relatively short horizontal louvers located below said inner ring and extending from the innermost louver of one vertical series to the corresponding louver of the opposite series.

3. An anti-glare attachment for headlights, composed of a single sheet-metal blank and comprising two concentric circular rings, the outer of said rings constituting a rim adapted for seating adjacent to the outer edge of the headlight glass, and the inner of said rings defining a central opening in the axial line of the headlight, and a plurality of series of struck-up light-deflecting louvers between said ring and said rim, each series being composed of a plurality of parallel louvers and occupying a definite field, certain of said series being disposed at right angles to certain other series.

4. A headlight dimmer composed of a single piece of material and comprising two concentric circular rings, the outer of said rings constituting a rim adapted for seating in the front portion of a headlight and the inner of said rings defining a central opening in the axial line of the light, and a plurality of series of inclined light deflecting louvers between said ring and said rim, each series being composed of a plurality of parallel louvers occupying a definite field, certain of said series being arranged to direct light rays in directions crossing rays directed by others of said series.

5. A headlight dimmer composed of a single piece of material comprising two concentric rings, the outer of said rings constituting a rim adapted for seating in the front of a headlight, and the inner of said rings defining a central opening in the axial line of the headlight, a plurality of parallel louvers occupying the field above said inner ring, and a plurality of louvers extending from the field of said first-mentioned louvers to the rim in a direction located at an angle to said first-mentioned louvers.

6. A headlight dimmer composed of a single piece of material comprising a circular ring adapted for seating in the front of a headlight, a circular member disposed in the axial line of the headlight, and a plurality of fields of louvers located intermediate said axial member and said ring, the louvers of some of said fields being disposed at an angle to those of others of said fields.

In testimony whereof, I affix my signature in presence of two subscribing witnesses.

ROBERT L. SLONAKER.

Witnesses:
H. E. DUNLAP,
W. F KEEFER.